United States Patent [19]

Bohnen

[11] Patent Number: 4,757,169
[45] Date of Patent: Jul. 12, 1988

[54] ELECTRIC SWITCHGEAR HAVING GUIDING MEANS SERVING FOR POSITIONING WITHIN A SWITCHBOARD CELL

[75] Inventor: Peter Bohnen, Berlin, Fed. Rep. of Germany

[73] Assignee: Siemens Aktiengesellschaft, Berlin and Munich, Fed. Rep. of Germany

[21] Appl. No.: 940,066

[22] Filed: Dec. 10, 1986

[30] Foreign Application Priority Data

Dec. 20, 1985 [DE] Fed. Rep. of Germany ....... 3545781

[51] Int. Cl.$^4$ .......................... H01H 9/22; H02D 1/04
[52] U.S. Cl. ............................ 200/485 B; 200/50 AA; 361/339
[58] Field of Search ............... 200/48 R, 485 B, 50 A, 200/50 AA; 261/336, 337, 338, 339, 342, 343, 391

[56] References Cited

U.S. PATENT DOCUMENTS

| 2,121,610 | 6/1938 | Rugg et al. ...................... 361/339 |
| 2,273,001 | 2/1942 | Mahoney ........................ 361/339 |
| 2,540,814 | 2/1951 | Eichelberger ................. 200/50 AA |
| 2,615,101 | 10/1952 | Caswell ....................... 200/50 AA |
| 2,702,324 | 2/1955 | Donaldson .................... 200/50 AA |
| 2,921,998 | 1/1960 | Pokorny et al. .............. 200/50 AA |
| 3,363,147 | 1/1968 | Cataldo et al. .............. 200/50 AA |
| 3,575,482 | 4/1971 | MacMaster et al. ........... 361/391 X |
| 3,710,044 | 1/1973 | Sharp .............................. 200/50 AA |
| 3,932,716 | 1/1976 | Mottel et al. ..................... 200/50 A |
| 4,002,865 | 1/1977 | Kuhn et al. .................... 200/50 AA |
| 4,051,334 | 9/1977 | Ericson ........................... 200/50 AA |
| 4,071,722 | 1/1978 | Hart ................................ 200/50 A |
| 4,112,269 | 9/1978 | Nelson et al. ................ 200/50 AA |
| 4,486,814 | 12/1984 | Ishikawa et al. .................... 361/339 |
| 4,555,602 | 11/1985 | Mennell ......................... 200/50 AA |

FOREIGN PATENT DOCUMENTS

| 977018 | 10/1975 | Canada ......................... 200/50 AA |
| 1640134 | 8/1970 | Fed. Rep. of Germany . |
| 1091106 | 4/1955 | France ........................... 200/50 AA |
| 1485491 | 6/1967 | France . |
| 1131851 | 10/1968 | United Kingdom ............ 200/50 A |

Primary Examiner—Henry J. Recla
Assistant Examiner—Ernest G. Cusick
Attorney, Agent, or Firm—Kenyon & Kenyon

[57] ABSTRACT

A circuit breaker comprises base angles to which sliding rails are connected. To the sliding rails are fastened coupling claws which have recesses for extending over coupling pins of a positioning drive. By posts of the coupling claws provision is made in conjunction with locking pieces attached to the rolling floor that the circuit breaker can be detached from the positioning drive only in its disconnected position.

6 Claims, 3 Drawing Sheets

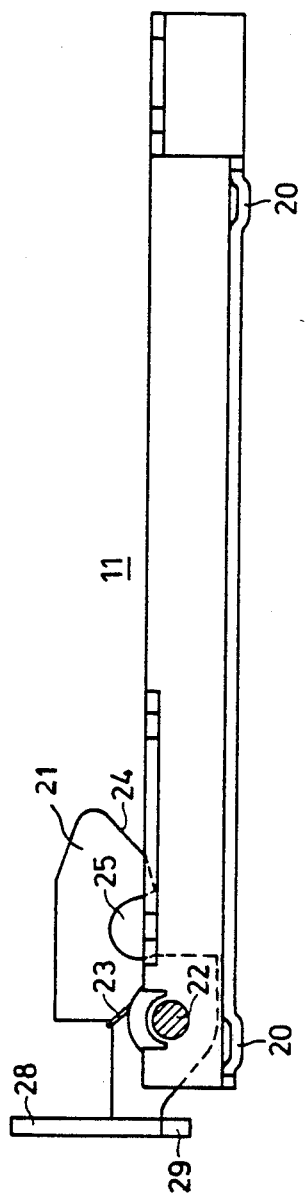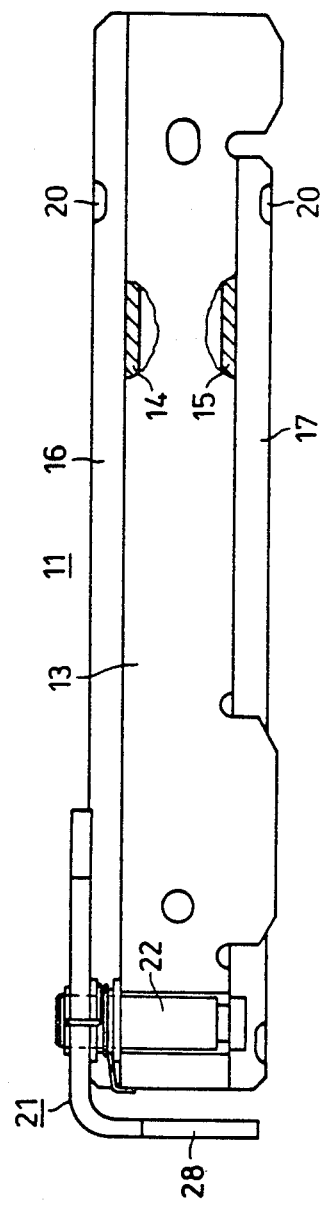

ELECTRIC SWITCHGEAR HAVING GUIDING MEANS SERVING FOR POSITIONING WITHIN A SWITCHBOARD CELL

BACKGROUND OF THE INVENTION

The present invention relates to electric switchgear having guiding means serving for positioning within a switchboard cell, and having a device for the detachable coupling of the switchgear to a positioning drive comprising a threaded spindle. Switchgear of this type has become known, for instance, from U.S. Pat. No. 4,112,269. There, rolls and bars arranged laterally to the switchgear serve as the guiding means.

SUMMARY OF THE INVENTION

It is an object of the present invention to retrofit switchgear intended for fixed installation into a design for a movable arrangement in a switchboard cell in a simple manner so that switchgear retrofitted in this manner can be coupled to a positioning drive.

The above and other objects of the present invention are achieved by an electric switchgear having guiding means serving for movement within a switchboard cell and having a device for the detachable coupling of the switchgear to a positioning drive comprising a threaded spindle, wherein the switchgear has at its side walls extending base ears to which profiled rails are detachably fastened which are provided with sliding surfaces and each of which comprises a coupling claw for coupling the switchgear to the positioning drive.

The base ears are particularly well suited for the fixed installation of switchgear since they provide adequate mounting surfaces for heavy switchgear and are highly accessible for the attachment of fastening means for example screws or bolts. Such base ears are equally well suited for attaching profiled rails, so that a simple set of parts is sufficient for retrofitting switchgear for a movable arrangement. By the profiled rails, the distance of the underside of the switchgear from the running floor is increased, whereby the mounting area of a pull-out frame or a switchboard cell can be used at the same time as the running floor for the switchgear and as the mounting surface for the positioning drive and parts cooperating therewith.

In this connection, the positioning drive can preferably be designed so that a cross piece which can be moved by the threaded spindle of the positioning drive parallel to the front side of the switchgear has two coupling pins extending on both sides. This provides an advantageous attachment of the coupling claw likewise on the front side of the profiled rails and thereby, at the front side of the switchgear, which creates an advantageous way of access.

For easy operation by hand, each coupling claw may have an a tab portion on the front side with a post pointing in the direction of the rolling floor of the switchgear. As the counterpiece for the post, a locking piece can be atttached to the rolling floor, the height of which corresponds to the distance of the post from the rolling floor and which covers the travel distance up to the disconnected position. Thereby, the coupling claw is blocked against operation by hand until the switchgear has reached its disconnected position and thereby, all electrical connections between the switchgear and the stationary part of the switchboard cell or the pull-out frame are interrupted. If the coupling claws are then actuated by means of the tab portions, the coupling between the positioning drive and the switchgear is disengaged and the switchgear can be removed from the switchboard cell or the pull-out frame.

The coupling claws provide a tensional connection between the switchgear and the positioning drive which acts in the direction of the travel path. However, it may be desirable in addition to guide the switchgear also perpendicularly thereto, for instance, in order to assure the proper cooperation between connecting bars of the switchgear on the back side and stationary break contact arrangements. According to a further embodiment of the invention, this guidance can be provided in that claws which have elongated holes for guiding the cross piece by means of coupling pins, form at their respective rear ends associated with the back side of the switchgear, an abutment for a holding pin provided for engagement with an elongated hole, open on one side, of each side wall of the switchgear. The length of these elongated holes or guiding slots needs to correspond only to the distance to be travelled between the disconnected position and the operating position of the switchgear, which, in a low-voltage switching installation, amounts to only a few cm.

BRIEF DESCRIPTION OF THE DRAWINGS

The invention will be explained in greater detail in the following detailed description with reference to the drawing figures, in which:

FIGS. 3 and 4 show, in a side view and a top view, a sliding rail with a coupling claw attached thereto.

DESCRIPTION OF THE PREFERRED EMBODIMENT

Figure 1:
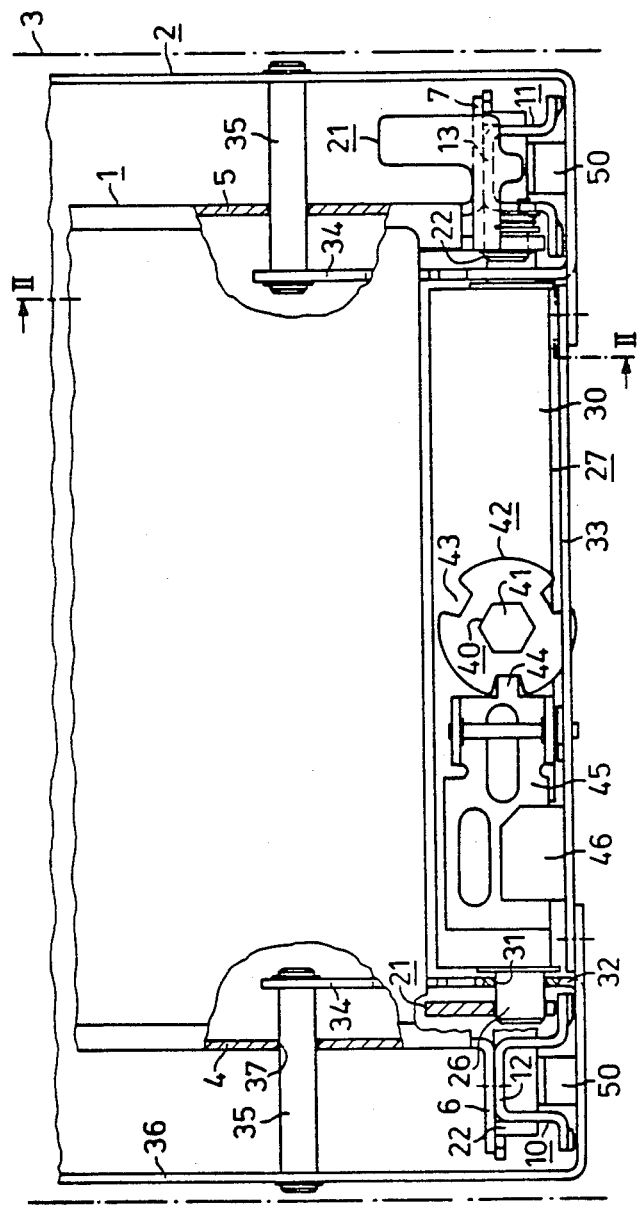
FIG. 1 shows a front view of part of a pull-out frame with a switchgear inserted therein.

As an example for a switchgear, FIG. 1 shows schematically a low-voltage circuit breaker 1 which is inserted into a pull-out frame 2. The pull-out frame 2 is in turn accommodated in a switchboard cell 3, for instance, a frame, a control cabinet or a similar support structure. Side walls 4 and 5 of the circuit breaker 1 are provided, with base ears 6 and 7 which extend outward at right angles and to which sliding rails 10 and 11 are fastened. This can be accomplished, for instance, by screws which go through the base ears 6 and 7, and the central parts 12 and 13 of the sliding rails 10 and 11. The sliding rails 10 and 11 are designed with mirror symmetry so that it is sufficient to explain the following features of the sliding rail 11 by referring to FIGS. 3 and 4.

The legs 14 and 15 of the sliding rail 11 have outward pointing ear portions 16 and 17 with pushed-out sliding projections 20 which slide directly on the bottom of the pull-out frame 2. Conventional lubricants are sufficient to move circuit breakers of relatively great weight without much effort. At the front end, the sliding rail 11 carries a coupling claw 21 which can be tilted on a pivot pin 22 which can be laid into a recess of the central part 13 of the legs 14 and 15. An upper cover is not required by this bearing aperture since the base ear 7 of the circuit breaker covers the bearing aperture in the assembly. A torsion spring 23 pretension the coupling claw 21 clockwise, referring to FIG. 3. An inclined starting surface 24 leads into a recess 25 which is fitted to a coupling pin 26 in a positioning drive 27 shown partially in FIG. 1.

Figure 2:
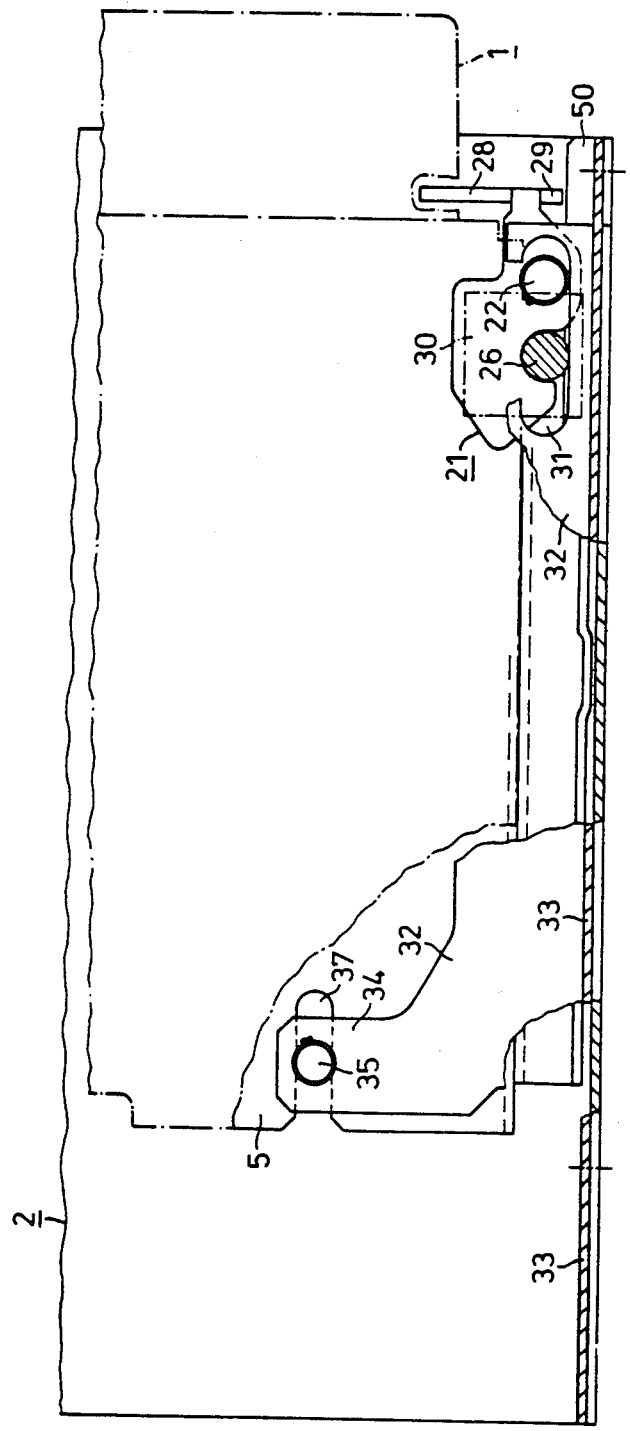
FIG. 2 shows parts of a positioning drive and adjoining parts of the switchgear, in a side view.

The positioning drive 27 comprises a cross piece 30 having coupling pins 26 extending on both sides which are guided in elongated holes 31 of jaws 32, the jaws being at right angles to a bottom plate 33 which forms the rolling floor for the circuit breaker 1. At their rear end, the jaws 32 form an abutment 34 for a mounting pin 35 of which the end opposite the abutment 34 engages a side wall 36 of the pull-out frame 2. An elongated hole 37 open toward the rear of the circuit breaker 1 extends over the associated mounting pin 35 if the circuit breaker is moved into the pull-out frame 1 (FIG. 2).

For moving the cross piece 30, a threaded spindle 40 is provided, the head 41 of which on the control side is designed as a hexagon. Likewise at the end of the threaded spindle 40 on the control side, there is a slot cam 42, with the recesses 43 of which a latch post 44 of a latch 45 can engage. By an unlatching slide 46, the latch 45 can be moved to the left in FIG. 1 in order to lift the latch projection 44 from the respective recess 43 of the slot cam 42.

When the circuit breaker 1 is inserted into the pull-out frame 2, the latter is deposited with the slide rails 10 and 12 on the bottom plate 33 of the pull-out frame 2 and can then be pushed into the pull-out frame until the coupling claws with their inclined starting surfaces 24 reach the coupling pins 26 and extend beyond them to receive pins 26 in the recesses 25. In the process, the holding pins 35 also extend into the elongated holes of the side walls 4 and 5 of the circuit breaker 1. The further motion of the circuit breaker 1 must be accomplished by rotation of the threaded spindle 40.

In the disconnect position, the tab portions 28 of the coupling claws 21 provided for manual operation must be actuated because when the circuit breaker 1 is moved, posts 29 located on the underside of the tab portions 28 extend into the vicinity of locking pieces 50 which are arranged on the bottom plate 33 of the pull-out carrier 2 and beyond which the legs 14 and 15 of the sliding rail 11 and similarly the legs of the sliding rail 10 extend. Thereby, protection is provided against the possibility that the circuit breaker 1 might be detached from the positioning drive in a manner that could be dangerous.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. An electric switchgear movable within a switchboard cell comprising positioning drive means provided in the switchboard cell for moving the switchgear, means for the detachable coupling of the switchgear to the positioning drive means, the positioning drive means comprising a threaded spindle, the switchgear having side walls having base ears extending therefrom to which rail means are detachably fastened, each of said rail means being provided with sliding surfaces, said switchboard cell being provided with a floor, said sliding surfaces being provided for slidable movement on the floor of the switchboard cell, and each rail means comprising a coupling claw for coupling the switchgear to the positioning drive means.

2. The switchgear recited in claim 1, wherein the switchgear has a front and two sides, and wherein the positioning drive means has a crosspiece which can be moved by the threaded spindle parallel to the front of the switchgear and having two coupling pins extending from the sides thereof.

3. The switchgear recited in claim 2, wherein the coupling claw is pivoted at the rail means and is provided with a recess for receiving one of the coupling pins, said coupling claw having an inclined starting surface for engaging the coupling pin, said starting surface provided ahead of the recess so that the inclined starting surface engages the coupling pin prior to the recess when the switchgear is slidably moved into ther switchboard cell.

4. The switchgear recited in claim 3, wherein each coupling claw has, for manual operation, a tab portion on a front side thereof with a pin pointing in the direction of the floor of the switchgear.

5. The switchgear recited in claim 4, wherein the switchgear has an electrically disconnected position, further comprising a locking piece having a height corresponding to the distance of the pin of the coupling claw from the floor and which has a length corresponding to a travel path of the switchgear up to the electrically disconnected position of the switchgear, said locking piece mounted at the floor of the switchgear, said locking piece preventing movement of said coupling claw until said switchgear is electrically disconnected and thus safe for removal.

6. The switchgear recited in claim 2, wherein the side walls of the switchgear have a front and a rear, and wherein the cross piece is guided by the coupling pins in elongated holes of jaws disposed at right angles to the floor, the jaws having, at rear ends thereof associated with the backside of the circuit breaker, an abutment for a holding pin provided for engagement with an elongated hole open toward the rear of each side wall of the switchgear.

* * * * *